Patented July 4, 1950

2,514,310

UNITED STATES PATENT OFFICE 2,514,310

COMPOSITION FOR PRODUCING FIRE EXTINGUISHING FOAMS AND METHOD

Warren F. Busse, Joseph M. Lambert, and Peter P. Debye, Easton, Pa., assignors to General Aniline & Film Corporation, New York, N. Y., a corporation of Delaware No Drawing. Application January 12, 1946, Serial No. 641,013

10 Claims. (Cl. 252—3)

The present invention relates to fire extinguishing and to new compositions for extinguishing fires and more particularly to such compositions which when combined with water and a gas, such as air, will produce fire extinguishing foams highly effective for extinguishing fires of flammable liquids.

It has already been proposed to prepare foam forming solutions which contain certain wetting agents and foam stabilizers. Preparations heretofore proposed are made up from various proteins, such as soy bean proteins, proteins from hoofs, albumen, and blood. However, the foams produced from such compositions, while more or less effective in extinguishing certain types of fires, do not produce a foam which is satisfactorily stable toward heat. As a result, large quantities of foam applied continuously and in great mass, and the building up of thick foam blankets are required for extinguishing the fires. Such solutions, accordingly, have been unsatisfactory in the extinguishment of spill and crash fires, such as airplane crash fires, since in the case of these fires, there are no protecting walls to retain thick layers of foam.

It is, accordingly, an object of our invention to produce solutions which readily form foam and which produce foams that have high heat stability.

It is a further object of our invention to produce foams which will extinguish fires with a thinner foam blanket.

Other objects of our invention are to provide foams which quickly spread and flow readily over the flammable liquid and possess self-sealing qualities, so that if for any reason the blanket of foam is broken, the break quickly seals itself and the fire is rapidly extinguished.

Another object of our invention is to provide solutions which generate foams that are highly impermeable to gases, thereby preventing evaporation of the flammable liquid and quickly extinguishing the fire.

A still further object of our invention is to provide a simple method for extinguishing flammable liquid fires, which extinguishes fires with minimum amounts of foam.

According to our invention we provide a composition containing a surface tension reducing agent and a carboxy methyl cellulose. More particularly, our invention comprises an aqueous solution containing a surface tension reducing agent and a water-soluble salt of carboxy methyl cellulose, such as, for example, the sodium, potassium, or ammonium salts.

The solutions may be prepared in concentrated form and then be diluted with the proper amount of water in the foam generating apparatus, such as any standard fire foam forming nozzle, in order to form the foam which is applied to the fire. This may be done by any of the so-called mechanical methods of producing fire extinguishing foam, as for example, by entraining a gas, such as air, into a moving stream of water into which the concentrated solution is also introduced in any desired proportion. Depending on the concentration of the starting solution, the ratio of dilution may be from 7 to 16 parts of water to 1 part of the concentrated solution. The ratios are expressed in terms of gallons of water to gallons of concentrated solution.

The concentration of the surface tension reducing agent in the final aqueous solution which is converted into foam may range from approximately 0.25–5% and that of the carboxy methyl cellulose about 0.1–2%. However, the preferred proportions are approximately equal amounts of each on a pound per pound basis. A preferred solution is one containing about 1% of the surface tension reducing agent and 1% of a water-soluble salt of a carboxy methyl cellulose.

The foams produced from such solutions are characterized by their high heat stability as compared with the standard commercial protein foam, their slow drainage, ready spreading over the flammable liquid, their ability to extinguish the fire with a thinner layer of foam, their impermeability to the gases generated by the flammable liquid, their large water content, and the self-sealing tendency of the foam blanket to cover the break in case the foam blanket is ruptured. Our foams are characterized especially by their great fluidity which enables them to blanket a fire quickly since they flow very readily over the surface of the fire, quickly covering the entire burning area. If hot gaseous vapor breaks through the foam cover, the break quickly seals and the flame is rapidly extinguished.

Illustrative of our invention are the following examples:

Example 1

For the production of a highly stable foam, the following is a suitable formula:

| | Parts |
|---|---|
| N-caprylyl, N-octyl taurine sodium salt | 1 |
| Carboxy methyl cellulose sodium salt | 0.5 |
| Water | 98.5 |

When finely divided air is sucked into and distributed throughout the solution as by use of a conventional foam forming nozzle, an extremely thick, fine bubble and stable foam is formed which may be applied to the fires and which extinguishes the same within a few seconds.

If desired, the concentration of the taurine may be as high as 10 parts by weight and that of the carboxy methyl cellulose also 10 parts. The resulting solution may be then introduced in a moving stream of water in the proper proportion together with air to form a foam which is applied to the fire.

*Example 2*

Another formula which produces a highly stable foam and has a high foaming power is the following:

| | Parts |
|---|---|
| Lauryl sodium sulfate | 1 |
| Carboxy methyl cellulose sodium salt | 1 |
| Water | 98 |

This solution may be converted into a foam by any suitable manner as by beating air into the same or by using the usual type of foam forming nozzle.

A gasoline fire covering an area of 475 square feet and involving 100 gallons of regular motor gasoline was extinguished in only 37 seconds when foam prepared from the solution of Example 2 was applied thereto at the rate of 200 gallons of solution per minute through a foam nozzle after the fire had been given a 10-second pre-burn. The extinguishing action was prompt and astoundingly decisive. The foam blanket, although quite thin, provided effective cover and prevented any re-ignition of the gasoline by the hot metal walls of the tank.

When a commercial protein foam was applied to a second fire involving the same amount of gasoline under the same conditions, the fire was not extinguished.

The heat stability of the foam produced by our compositions as compared with the standard commercial protein foams is indicated by the following tests:

A half-inch layer of foam made from a 6% solution of the commercial foam referred to above was formed on the surface of gasoline which has been placed in a 5-inch diameter Petri dish. A Bunsen burner flame was then directed on the surface of the foam until the gasoline ignited and the time required was measured. In the case of the commercial foam, the foam blanket was burned off and the gasoline was ignited within 23 seconds. When the same test was applied, except that the foam layer was prepared from an aqueous solution of 1% of N-caprylyl, N-octyl taurine sodium salt and 0.5% of carboxy methyl cellulose sodium salt, the time required to burn off the foam blanket and ignite the gasoline was 42 seconds.

Furthermore, the amount of foam produced by the same amount of solution was considerably greater in the case of the solutions comprising our invention as compared with the above-mentioned commercial foam. This is demonstrated by the following test:

50 cc. of a 6% commercial foam solution was shaken in a 500 cc. graduate. The amount of foam formed was 375 cc. The same amount of solution made up of 1% of N-caprylyl, N-octyl taurine sodium salt and 0.5% of carboxy methyl cellulose sodium salt was shaken for the same amount of time and formed 500 cc. of foam.

While the standard commercial protein foams require the presence of certain salts, such as iron salts, to increase their heat stability, the foam forming solutions formed according to our invention produce excellent heat stable foams without the addition of other ingredients. However, where it is desired, salts may be added which have this effect, such as ferrous chloride, and ferrous sulfate.

In addition to sodium lauryl sulfate in the above example, there may be used in general other salts of other sulfuric esters of high aliphatic alcohols containing more than 8 carbon atoms as, for example, the sodium, potassium, and ammonium salts of nonyl, decyl, undecyl, hexadecyl and octadecyl sulfates or mixtures thereof. In addition to the N-caprylyl, N-octyl taurine, there may be used N-acyl, N-alkyl taurines in which the acyl and the alkyl radicals each contain at least 7 carbon atoms as, for instance, N-heptoyl, N-heptyl taurine; N-heptoyl, N-octyl taurine; N-2-ethyl hexoyl, N-octyl taurine; N-lauroyl, N-lauryl taurine; and N-dodecyl, N-amyl taurine; and the alkali metal salts thereof as, for example, the sodium, potassium, and ammonium salts. Examples of other surface tension reducing agents which may be used include the alkali metal salts of the dialkyl esters of sulfosuccinic acid, e. g., dihexyl sodium sulfosuccinate, diamyl sodium sulfosuccinate, dioctyl sodium sulfosuccinate, and diisobutyl sodium sulfosuccinate; the alkali metal and ammonium salts of trialkyl sulfotricarballylates, such as the sodium and ammonium triisobutyl sulfotricarballylate; alkali metal salts of alkyl-naphthalenesulfonic acids, e. g., sodium diisopropyl naphthalenesulfonate; pentadecanone sodium sulfonate and alkyl-phenol-ethylene oxide condensation products, e. g., the diisobutylphenol-ethylene oxide condensation product.

The advantages of our novel compositions are that they readily form abundant foam and that the foam produced is highly stable to heat, requiring no metal salts as heretofore required with protein foams to stabilize them against heat. In addition, the foam is highly stable toward the flammable liquid to which it is applied. It floats on the liquid for very long periods of time. Owing to its high stability, re-ignition or "flashbacks" of the flammable liquid, when it comes in contact with hot metal, is prevented by the heat resistant fire-smothering blanket produced by the foam.

In addition, the foam is highly impermeable to the vapors of the burning liquid, contains a considerable amount of water which aids in the extinguishment of the fire, and entrains the water in the foam bubbles so that the foam drains very slightly. Another feature of our foam producing compositions is that they can form small size bubbles and that the foam can be formed from relatively concentrated solutions of the ingredients, thereby making it unnecessary to store and to transport large quantities of liquid.

Still another advantage of our compositions is that some of the surface tension reducing agents used form solutions which have a positive spreading coefficient, when applied to water-immiscible flammable liquids, such as benzene, toluene, xylene, kerosene, fuel oils and turpentine. By this, we mean that the surface tension of the solution plus the interfacial tension is less than the surface tension of the flammable liquid. As a result of such positive spreading coefficient, the solutions have a tendency spontaneously to cover the flammable liquid with an aqueous film, thus reducing the rate of evaporation and aiding in the extinguishment of the fire. Thus, our solutions exert a double fire extinguishing action, namely, that of the aqueous film which tends to reduce evaporation and that of the foam which reenforces the film and smothers the fire. As a result of the action of the aqueous film on the surface of the fire, a thinner foam blanket will smother the fire. This means a considerable economy in the amount of foam solution required to extinguish a fire.

Because of the positive spreading coefficient, the foam tends to be self-sealing so that if the foam blanket is ruptured, it readily tends to seal itself and extinguish any flames in the area which has been uncovered. Since only a thin foam blanket is necessary to extinguish the fire, our foam solutions are highly effective for extinguishing crash and spill fires where there are no retaining walls to permit building up of heavy or thick foam blankets.

We claim:

1. A composition of matter suitable for producing fire extinguishing foam which essentially consists of an aqueous solution of approximately 1% of an N-acyl, N-alkyl taurine sodium salt and approximately 0.5% of carboxy methyl cellulose sodium salt.

2. A composition of matter suitable for producing fire extinguishing foam which essentially consists of an aqueous solution of about 1% of an alkali metal salt of a sulfuric acid ester of a higher aliphatic alcohol and about 0.5-2% of carboxy methyl cellulose sodium salt.

3. A method of extinguishing fires which comprises applying to the burning material a foam produced from a composition which consists essentially of an aqueous solution of about 1% of N-capryl, N-octyl taurine sodium salt and about 0.5% of carboxy methyl cellulose.

4. A method of extinguishing fires which comprises applying to the burning material a foam produced from a composition which consists essentially of an aqueous solution of about 1% of lauryl sodium sulfate and about 1% of carboxy methyl cellulose sodium salt.

5. A composition of matter for producing fire extinguishing foams, which essentially consists of an aqueous solution of a member of the group consisting of anionic and non-ionic, non-saponaceous surface tension reducing agents in a concentration of 0.25 to 5% and a carboxy methyl cellulose in a concentration of 0.1 to 2%.

6. A composition of matter according to claim 5, wherein the surface tension reducing agent is a N-acyl, N-alkyl taurine sodium salt.

7. A composition of matter according to claim 6, wherein the surface reducing agent is an alkali metal salt of a sulfuric acid ester of a higher aliphatic alcohol.

8. A composition of matter for producing fire extinguishing foams which essentially consists of an aqueous solution of a member of the group consisting of anionic and non-ionic, non-saponaceous surface-tension reducing agents and a carboxy methyl cellulose, in such concentrations as to yield upon dilution with water an aqueous solution in which the concentration of the surface tension reducing agent is 0.25 to 5% and the concentration of the carboxy methyl cellulose is 0.1 to 2%.

9. A method of extinguishing fires which comprises applying to the burning material a foam produced from a composition which essentially consists of an aqueous solution of a member of the group consisting of anionic and non-ionic, non-saponaceous surface-tension reducing agents in a concentration of 0.25% to 5%, and a carboxymethyl cellulose in a concentration of 0.1% to 2%.

10. A composition for producing fire extinguishing foam which essentially consists of an aqueous solution of a member of the group consisting of anionic and non-ionic, non-saponaceous surface-tension reducing agents in a concentration of 0.25 to 5%, and carboxy methyl cellulose sodium salt in a concentration of 0.1 to 2%.

WARREN F. BUSSE.
JOSEPH M. LAMBERT.
PETER P. DEBYE.

REFERENCES CITED

The following references are of record in the file of this patent:

UNITED STATES PATENTS

| Number | Name | Date |
|---|---|---|
| 1,843,420 | Guenther | Feb. 2, 1932 |
| 2,028,091 | Jaeger | Jan. 14, 1936 |
| 2,045,015 | Koerding | June 23, 1936 |
| 2,154,231 | Daimler | Apr. 11, 1939 |
| 2,166,088 | Holter | July 11, 1939 |
| 2,258,587 | Goodner | Oct. 14, 1941 |
| 2,315,375 | Nawiasky | Mar. 30, 1943 |
| 2,389,761 | Burgeni | Nov. 27, 1945 |

FOREIGN PATENTS

| Number | Country | Date |
|---|---|---|
| 209,469 | Switzerland | July 16, 1940 |

OTHER REFERENCES

Chemical and Metallurgical Engineering, March 1944, pages 139 and 140.

Goldsmith: "Non-Ionic Surface Active Agents," in Chemical Industries, March 1943.